United States Patent
Moussette et al.

(10) Patent No.: US 9,613,506 B2
(45) Date of Patent: Apr. 4, 2017

(54) SYNCHRONIZATION OF INDEPENDENT OUTPUT STREAMS

(71) Applicant: Apple Inc., Cupertino, CA (US)

(72) Inventors: Camille Moussette, Cupertino, CA (US); Douglas S. Wyatt, Cupertino, CA (US); Anthony J. Guetta, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/702,705

(22) Filed: May 2, 2015

(65) Prior Publication Data

US 2015/0348379 A1 Dec. 3, 2015

Related U.S. Application Data

(63) Continuation-in-part of application No. 14/292,690, filed on May 30, 2014.

(60) Provisional application No. 62/044,891, filed on Sep. 2, 2014.

(51) Int. Cl.

| | |
|---|---|
| H04R 5/00 | (2006.01) |
| G08B 6/00 | (2006.01) |
| G08B 3/10 | (2006.01) |
| G11B 27/10 | (2006.01) |
| H04N 21/43 | (2011.01) |

(52) U.S. Cl.
CPC ............ *G08B 6/00* (2013.01); *G08B 3/10* (2013.01); *G11B 27/10* (2013.01); *H04N 21/4307* (2013.01)

(58) Field of Classification Search
CPC . G08B 6/00; G08B 3/10; G11B 27/10; H04N 21/4307
See application file for complete search history.

(56) References Cited

U.S. PATENT DOCUMENTS

| | | | |
|---|---|---|---|
| 5,333,299 | A | 7/1994 | Koval et al. |
| 5,422,635 | A | 6/1995 | Morishima |
| 5,508,688 | A | 4/1996 | Mochizuki |
| 5,642,171 | A | 6/1997 | Baumgartner et al. |
| 5,696,497 | A | 12/1997 | Mottier et al. |
| 5,870,684 | A | 2/1999 | Hoashi et al. |
| 5,877,676 | A | 3/1999 | Shankarappa |
| 6,408,187 | B1 | 6/2002 | Merriam |

(Continued)

FOREIGN PATENT DOCUMENTS

| | | |
|---|---|---|
| CN | 103179258 | 6/2013 |
| CN | 103778527 | 5/2014 |

(Continued)

*Primary Examiner* — Andrew L Sniezek
(74) *Attorney, Agent, or Firm* — Brownstein Hyatt Farber Schreck, LLP

(57) ABSTRACT

A system determines to use at least two independent renderers to render at least two output streams that are to be synchronized. The independent renderers are provided with a shared synchronization object when instructed to render the respective output stream. A time when all of the independent renderers can render a respective first buffer of the respective output stream is determined from the shared synchronization object. Rendering of the output streams utilizing the independent renderers is begun at the determined time. In this way, rendering of the output streams may be synchronized.

21 Claims, 10 Drawing Sheets

(56) References Cited

U.S. PATENT DOCUMENTS

| | | |
|---|---|---|
| 6,426,740 B1 | 7/2002 | Goto |
| 6,954,657 B2 | 10/2005 | Bork et al. |
| 7,136,482 B2 | 11/2006 | Wille |
| 7,346,698 B2 | 3/2008 | Hannaway |
| 7,469,155 B2 | 12/2008 | Chu |
| 7,599,753 B2 | 10/2009 | Taylor et al. |
| 8,040,224 B2 | 10/2011 | Hwang |
| 8,116,863 B2 | 2/2012 | Vaisnys et al. |
| 8,144,612 B2 | 3/2012 | Johnson et al. |
| 8,483,286 B2 | 7/2013 | Wang |
| 8,519,841 B2 | 8/2013 | Fukuyori |
| 8,536,992 B2 | 9/2013 | Oh et al. |
| 9,240,021 B2 | 1/2016 | Rodriguez |
| 9,265,458 B2 | 2/2016 | Stack |
| 9,307,318 B2 | 4/2016 | Anderton et al. |
| 2005/0176384 A1 | 8/2005 | Matsuoka et al. |
| 2009/0051509 A1 | 2/2009 | Hwang |
| 2010/0066512 A1* | 3/2010 | Rank .............. G06F 3/016 340/407.2 |
| 2010/0148942 A1 | 6/2010 | Oh et al. |
| 2011/0084795 A1 | 4/2011 | Fukuyori |
| 2012/0096398 A1 | 4/2012 | Greenspan et al. |
| 2012/0099594 A1 | 4/2012 | Lau et al. |
| 2012/0106651 A1 | 5/2012 | Wang |
| 2013/0202134 A1 | 8/2013 | Afshar |
| 2014/0247120 A1* | 9/2014 | Ullrich ................ G06F 3/016 340/407.1 |
| 2014/0254813 A1 | 9/2014 | Anderton et al. |
| 2014/0292501 A1* | 10/2014 | Lim .................... G08B 6/00 340/407.2 |
| 2015/0154966 A1* | 6/2015 | Bharitkar .......... G10L 19/008 381/23 |
| 2015/0256674 A1 | 9/2015 | Iwasaki et al. |
| 2015/0348379 A1 | 12/2015 | Moussette et al. |
| 2016/0063848 A1 | 3/2016 | Moussette et al. |

FOREIGN PATENT DOCUMENTS

| | | |
|---|---|---|
| EP | 0973138 | 1/2000 |
| GB | 2367173 | 3/2002 |
| JP | 2009015787 | 1/2009 |
| WO | WO 2006/057770 | 6/2006 |

\* cited by examiner

500A

| RENDERER | STATUS TIME | FRAMES REQUESTED FOR RENDERING | STATUS |
|---|---|---|---|
| SPEAKER | 100 | 100 | READY |
| HAPTIC | NA | NA | WAITING |

| RENDERER | STATUS TIME | FRAMES REQUESTED FOR RENDERING | STATUS |
|---|---|---|---|
| SPEAKER | 100 | 100 | READY |
| HAPTIC | 125 | 50 | READY |

| RENDERER | STATUS TIME | FRAMES REQUESTED FOR RENDERING | STATUS |
|---|---|---|---|
| SPEAKER | 100 | 100 | READY |
| HAPTIC | 175 | 50 | READY |

| RENDERER | STATUS TIME | FRAMES REQUESTED FOR RENDERING | STATUS |
|---|---|---|---|
| SPEAKER | 200 | 100 | SYNCED |
| HAPTIC | 175 | 50 | SYNCED |

FIG. 5D

SYNCHRONIZATION OF INDEPENDENT OUTPUT STREAMS

CROSS-REFERENCE TO RELATED APPLICATIONS

This application is a continuation-in-part of U.S. patent application Ser. No. 14/292,690, filed on May 30, 2014, and entitled "Synchronization of Independent Output Streams," which is incorporated by reference as if fully disclosed herein. This application also claims the benefit under 35 U.S.C. §119(e) of U.S. Provisional Patent Application No. 62/044,891, filed on Sep. 2, 2014, and entitled "Synchronization of Independent Output Streams," which is incorporated by reference as if fully disclosed herein.

TECHNICAL FIELD

This disclosure relates generally to streamed output, and more specifically to synchronization of independent output streams that may correspond to differing types of output, such as audio and haptic output.

BACKGROUND

Electronic devices may render streams of audio to drive components such as speakers, actuators, and so on. Typically, such electronic devices may render multiple streams of audio within a particular period of time. In some cases, the rendering of such multiple streams of audio may need to be synchronized with another type of output, such as a haptic or visual output.

For example, a haptic output device may include both a tactile and an audio component as part of a haptic output. The components that produce the tactile and audio components may be driven by data that is delivered ("streamed") from an internal processing unit. In such an example, many electronic devices simply output the tactile and audio outputs as they are received from the processing unit, according to a time stamp in the data streams of the tactile and audio data, or otherwise approximate rendering the two output types are roughly the same time.

However, these approaches do not necessarily yield true synchronized output. For example, the latency between the processing unit and one of the rendering components may be different than the latency between the processing unit and another of the rendering components. Likewise, data for one type of output may be ready or transmitted before the other type of data. Further, it may simply take more time for one of the rendering components to prepare and output its data.

Additionally, some electronic devices that utilize independent renderers to render each of the multiple output streams may not synchronize the renderings. To the contrary, such an electronic device may instruct independent renderers to render the various multiple streams and accept any lack of synchronization that occurs. Other electronic devices may combine rendering of the multiple streams into a single, unitary process. However, in such a case the rendering of the various multiple streams is not performed independently.

In the above cases, there may be a perceptible dissonance between the various types of output. They may appear to be out of sync, thereby losing their effectiveness and creating an unpleasant sensation in a user.

Accordingly, an improved apparatus and method for synchronizing output rendering may be useful.

SUMMARY

The present disclosure discloses systems, computer program products, and methods for synchronizing independent output streams, for example to provide an alert having two or more component outputs. At least two output streams that are to be synchronized may be rendered using at least two independent renderers. The independent renderers are provided with a shared synchronization object when instructed to render the respective output stream; the shared synchronization object may come from a synchronization component. A time when all of the independent renderers can render a respective first buffer of the respective output stream (i.e., "synchronization time") may be determined from the shared synchronization object. Rendering of the output streams utilizing the independent renderers may be begun at the determined time. In this way, rendering of the output streams may be synchronized. Such synchronization may ensure that a user experiences the outputs as intended. Further, in certain embodiments such synchronization may also enable component(s) to stay within a power utilization constraint that would be exceeded if the output streams were rendered without synchronization.

Embodiments disclosed herein may take the form of a system for providing an alert, comprising: a memory operative to store a first and second plurality of output waveforms; at least one processing unit operatively coupled to the memory; a first output device operatively coupled to the at least one processing unit; and a second output device operatively coupled to the at least one processing unit; wherein the first output device is operative to output a first waveform from the first plurality of output waveforms, the first output device configured to provide a first alert modality; the second output device is operative to output a second waveform from the second plurality of output waveforms, the second output device configured to provide a second alert modality; the first and second alert modalities are different; and output of the second waveform is delayed until at least 85% of the first waveform is outputted.

Another embodiment may take the form of a method for providing an alert comprising multiple component outputs, comprising: beginning outputting a first component output from a first output structure; waiting a specified time; beginning outputting a second component output from a second output structure after the specified time; wherein the second component is of a different modality than that of the first component; and an intensity of the first component output is reduced after beginning output of the second component output.

Yet another embodiment may take the form of a method for providing an alert, comprising: entering an alert condition; initiating an alert in response to entering the alert condition; retrieving component outputs of the alert; determining an order of the component outputs; setting a time delay between initiating each of the component outputs; and outputting the alert in accordance with the order and the time delay; wherein at least 85% of one of the component outputs is completed prior to outputting a second of the component outputs.

Still another embodiment may take the form of a system for providing an alert, comprising: a memory operative to store a first and second plurality of output waveforms; at least one processing unit operatively coupled to the memory; a first output device operatively coupled to the at least one processing unit; a second output device operatively coupled to the at least one processing unit; wherein the first output device is operative to output a first waveform from the first plurality of output waveforms, the first output device configured to provide a first alert modality; the second output device is operative to output a second waveform from the second plurality of output waveforms, the second output device configured to provide a second alert modality; the first and second alert modalities are different; and output of the second waveform is delayed relative to output of the first waveform by a duration sufficient to maintain power consumption for outputting the first and second waveforms to no more than one watt at any time during output.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 5A-5D are diagrams illustrating an example synchronization object for two output streams during synchronization.

DETAILED DESCRIPTION

Figure 1:
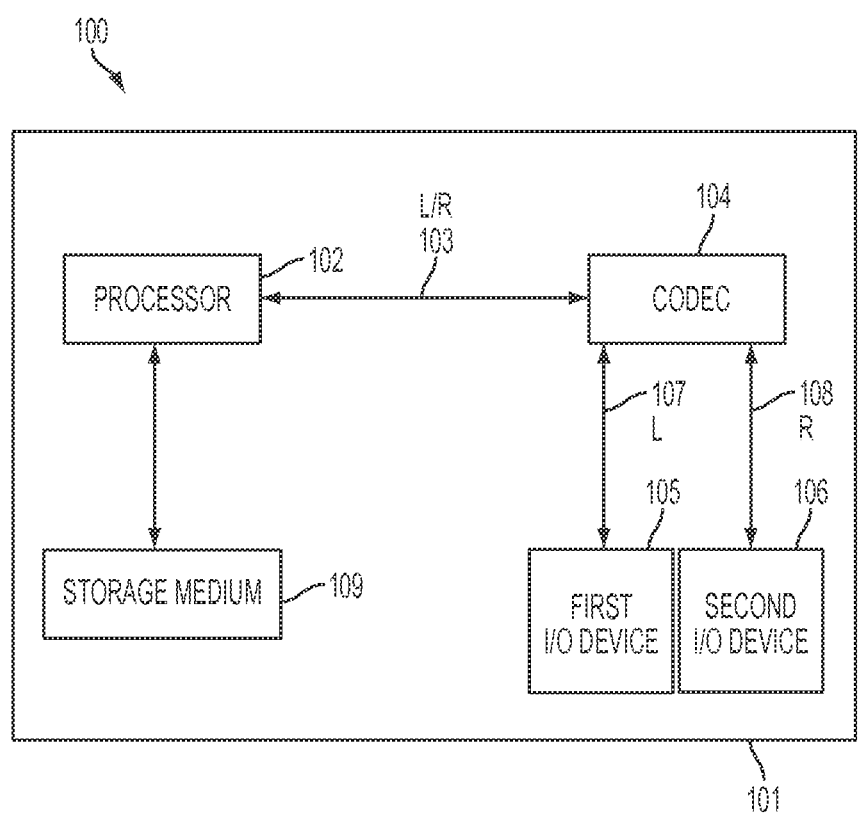
FIG. 1 is a block diagram illustrating an example system for synchronizing independent output streams.

The description that follows includes sample systems, methods, and computer program products that embody various elements of the present disclosure. However, it should be understood that the described disclosure may be practiced in a variety of forms in addition to those described herein.

The present disclosure discloses systems, computer program products, and methods for synchronizing independent output streams, for example to provide an alert having two or more component outputs. At least two output streams that are to be synchronized may be rendered using at least two independent renderers. The independent renderers are provided with a shared synchronization object when instructed to render the respective output stream; the shared synchronization object may come from a synchronization component. A time when all of the independent renderers can render a respective first buffer of the respective output stream (i.e., "synchronization time") may be determined from the shared synchronization object. Rendering of the output streams utilizing the independent renderers may be begun at the determined time. In this way, rendering of the output streams may be synchronized. Such synchronization may ensure that a user experiences the outputs as intended. Further, in certain embodiments such synchronization may also enable component(s) to stay within a power utilization constraint that would be exceeded if the output streams were rendered without synchronization.

In some implementations, the output streams may be utilized to drive different components such as a speaker and an actuator that provides a haptic output to provide the alert to a user. For example, a system may provide a haptic output that includes a sound produced by a speaker driven by a first rendered audio stream and a haptic output produced by an actuator driven by a second rendered haptic data stream. Synchronization of the two different output streams may ensure that the audio and haptic outputs are experienced by the user at the same time. Further, output streams may be designed to utilize the speaker and the actuator without available power at a given time. Synchronization may ensure that the speaker and actuator do not collectively use an unplanned excessive amount of power at the given time, staying within a constraint of available power.

Certain embodiments may employ the two channels of a stereo audio data stream to provide output streams for both the first and second output renderers or other devices. For example, a first channel of the stereo audio channel may be used to transmit data corresponding to a desired audio output. The second stereo channel may be used to transmit data corresponding to a desired haptic output from an actuator. This may be particularly useful where mono audio is desired from a speaker or set of speakers, insofar as the otherwise unused (or duplicate) audio channel may be used to transmit data for a second type of output. As another example, graphical data could be transmitted on this second stereo channel. A single alert may be formed of multiple output streams, each of which corresponds to a component output of a different modality (e.g., visual, auditory, haptic, and so on).

The aforementioned shared synchronization object may be one or more data structures such as an array. The shared synchronization object may include data identifying the independent renderers, a status time for each independent renderer, a number of frames requested for rendering for each independent renderer, a status for each independent renderer, and/or any other such information related to the independent renderers and/or rendering of the output streams.

In some cases, information in the shared synchronization object may be analyzed to determine the synchronization time by ascertaining a next input/output cycle time of any renderer after all renderers are ready to render. In this way, all of the independent renderers can be instructed to begin rendering at a synchronization time when all independent renderers are capable of rendering.

In some implementations, the independent renderers may employ the same codec, which is a program or hardware capable of encoding or decoding a digital data stream, under the direction of one or more processing units. In some cases of such implementations that produce a dual-nature output, including a sound produced by a speaker driven by a first rendered audio stream and a haptic output produced by an actuator driven by a second rendered haptic output stream, a processing unit may transmit the audio and haptic streams through a stereo audio channel. Similarly, the processing unit may be connected to each of the speaker and the actuator by mono audio channels, splitting the channels of the stereo audio connection from the processing unit.

In one or more implementations, waveforms for one or more of the output streams may be retrieved from one or more non-transitory storage media (such in the case of system sounds that have been pre-synthesized and stored for frequent use, accessible by referencing a lookup table and/or other data structure) and/or synthesized at the time of rendering. In various implementations, the output streams may have different sample frame rates, sampling rates, durations, and/or other rendering and/or other characteristics. However, in various other implementations one or more output streams may have one or more characteristics in common with each other.

FIG. 1 is a block diagram illustrating an example system 100 for synchronizing independent output streams. The system may include an electronic device 101 which may be any kind of electronic device such as a laptop computer, a desktop computer, a wearable device, a timekeeping device, a health monitoring device, a digital media player, a mobile computer, a cellular telephone, a smart phone, and/or any other electronic device that renders output streams.

The electronic device 101 may include one or more processing units 102, one or more codecs (e.g., digital to analog converters) 104 (in the event the codec is implemented as a stand-alone device or circuit, rather than being a program executed by the processing unit), one or more first input/output devices 105 (such as one or more speakers and/or other audio output devices), one or more second input/output devices 106 (such as one or more actuators and/or other tactile output devices), and one or more non-transitory storage media 109 (which may take the form of, but is not limited to, a magnetic storage medium; optical storage medium; magneto-optical storage medium; read only memory; random access memory; erasable programmable memory; flash memory; and so on).

As illustrated, in some cases the processing unit 102 may be connected to the codec 104 by a stereo audio channel 103, or may be connected directly to the output devices 105, 106. Similarly, the codec may be connected to the first input/output device 105 by a first mono audio channel 107 and to the second input/output device 106 by a second mono audio channel 108, splitting the channels of the stereo channel to the processor. However, it is understood that this is an example and that in various implementations any number of connections having any number of channels between any number of processors, codecs, and input/output devices are possible without departing from the scope of the present disclosure. Further, it should be appreciated that one or both of the input/output devices 105, 106 may lack input functionality in certain embodiments and be only output devices, such as a speaker, haptic actuator, and the like.

The processing unit 102 may execute instructions stored in the non-transitory storage medium 109 that cause the processing unit to determine to render at least two output streams that are to be synchronized.

For example, the processing unit 102 may receive a user input and the processing unit may determine to provide a haptic response to the user input. As another example, the electronic device 101 may enter an alert condition and thus output an alert to a user. The first input/output device 105 in this example may be a speaker and the second input/output device 106 may be an actuator in this example. The processing unit may determine to provide a haptic response to the user input by driving both the speaker and the actuator respectively using two separate and independent output streams. In order for the sound and haptic output to be perceived by the user as part of the same overall response, the output streams may need to be synchronized. Further, the output streams that drive the speaker and actuator may be designed to stay within a power constraint at a particular time of the electronic device 101. If the output streams driving the speaker and actuator are not synchronized, power utilized by driving the speaker and the actuator may be more than expected by designers and may exceed available power at a given time. As such, synchronization of the output streams may enable the electronic device to stay within power constraints.

The processing unit 102 may utilize the codec 104 to render the output streams (e.g., to encode the streams) or a separate synchronization component may do so. This may be particularly useful when, for example, the output streams are left and right channels of a stereo audio channel. Each of the output streams is generally transmitted to a separate output device 105, 106, even if both are instantiated as the left and right audio channels of the stereo data.

Although the processing unit may instruct a single hardware component to render the output streams in some implementations, separate independent renderers may be executed in software to encode each of the output streams. In some cases, the separate independent renderers may all be executed by the same codec or other hardware. Likewise, in some embodiments the codec may be a program executed by the processing unit 102, rather than separate hardware. Further, in some embodiments the renderer or renderers may use one or more codecs, or may output data to one or more codecs, for encoding or decoding.

The independent renderers may be provided with a shared synchronization object when instructed (such as by the processing unit 102) to render the respective output stream. A time (i.e., synchronization time) when all of the independent renderers can render a respective first buffer of the respective output stream may be determined from the synchronization object. Each of the independent renderers may begin rendering the respective output stream at the determined time, synchronizing rendering of the output streams.

In various cases, the output streams may (or may not) have different sample frame rates, sampling rates, durations, and/or any other characteristics. The independent renderers may attempt to begin rendering at various times. However, utilization of the shared synchronization object may enable synchronization despite these factors.

In some implementations, the shared synchronization object may be one or more data structures such as an array, table, list, and/or other data structure. The shared synchronization object may include data that identifies all of the independent renderers, a status of each of the independent renderers (such as a "ready" status, a "waiting" status, a "cancelled" status, and/or other such statuses), a status time for each independent renderer, a number of frames requested for rendering for each independent renderer, and/or other information related to the independent renderers.

The shared synchronization object may be analyzed to determine the synchronization time by ascertaining a next input/output cycle time of any renderer after all renderers are ready to render. In this way, the synchronization time may be set as a time when all of the independent renderers will be ready to render. The independent renderers may be instructed to begin rendering at that determined synchronization time.

In some cases, waveforms for one or more of the output streams may be retrieved from the non-transitory storage medium 109 for rendering. For example, frequently used sounds such as "system sounds" may be pre-synthesized and stored, accessible by referencing a lookup table and/or other data structure for a particular reference number associated with a particular system sound, retrievable upon determination to render. In other cases, waveforms for one or more of the output streams may be synthesized at the time of rendering. Regardless, the synchronization techniques described in the present disclosure may be unaffected by whether the output streams are stored and retrieved and/or synthesized at the time of rendering.

Figure 2:
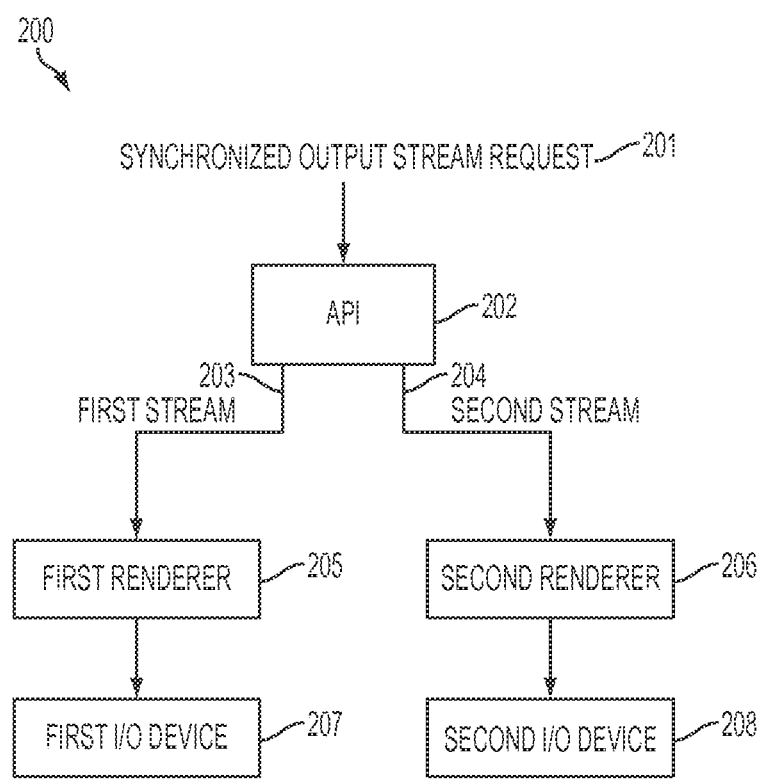
FIG. 2 is a block diagram illustrating the functioning of example software elements that may be executed by the system of FIG. 1.

FIG. 2 is a block diagram illustrating the functioning 200 of example software elements that may be executed by the system of FIG. 1. As illustrated, an application programming interface 202 (which may be executed by the processing unit 102 of the electronic device 101 of FIG. 1) may receive a request 201 to synchronize the rendering multiple output streams. The application programming interface may instruct separate software renderers 205-206 to each render one of the multiple output streams. As part of such instruction, the application programming interface may also pass the independent renderers a shared synchronization object. A synchronization time when the independent renderers can all render their respective output streams may be determined and the independent renderers may begin rendering their respective output streams (respectively providing the respective rendered streams to drive a first input/output device 207 and a second input/output device 208) at that determined time.

In this example, the multiple output streams may be two output streams that are to be synchronized. As illustrated, FIG. 2 includes a first renderer 205 that is instructed to render a first audio stream 203, corresponding to an audio output, and a second renderer 206 that is instructed to render a second haptic output stream 204, corresponding to a haptic output. However, it is understood that this is an example and that any number of output streams rendered by any number of independent renderers may be synchronized.

Figure 3:
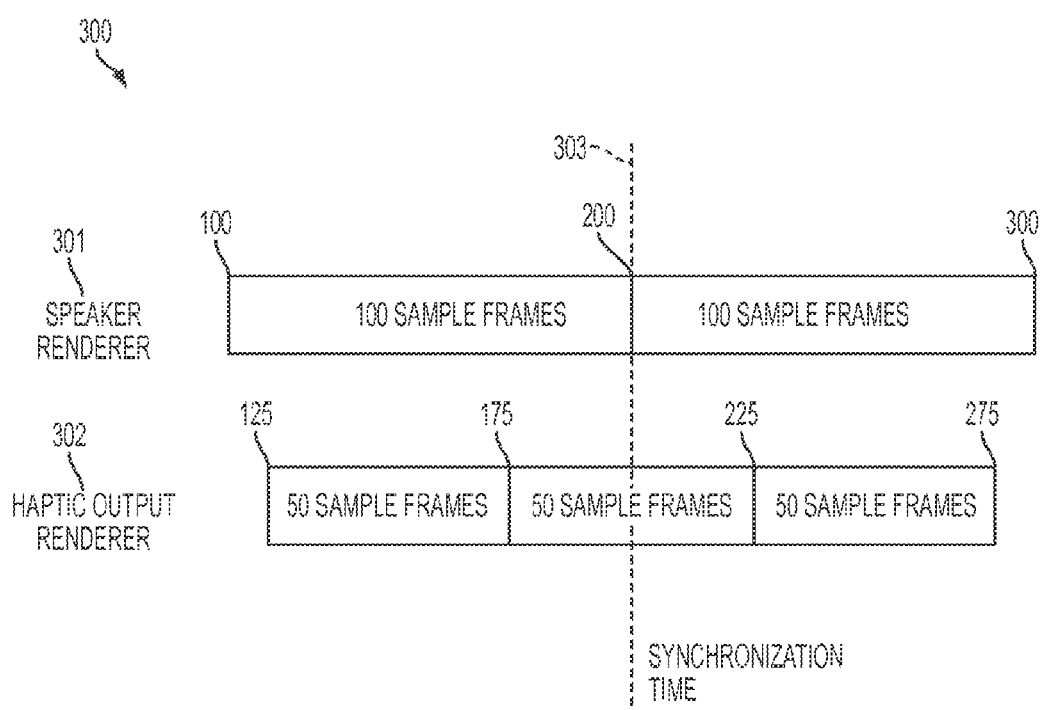
FIG. 3 is a diagram illustrating an example of the operation of two independent renderers for which a synchronization time is determined.

FIG. 3 is a diagram illustrating an example of the operation 300 of two independent renderers 301 and 302 for which an embodiment may determine a synchronization time 303. In this example, the first independent renderer may be a speaker renderer that drives a speaker and the second independent renderer may be a haptic renderer that drives an actuator. However, it is understood that this is an example and any number of various kinds of independent renderers may be utilized without departing from the scope of the present disclosure.

As illustrated, the speaker renderer 301 attempts to begin rendering at a time 100 and has a buffer size of 100 sample frames. Thus, the speaker renderer could begin rendering the first buffer of 100 sample frames between the time 100 and a time 200 and a second buffer of 100 sample frames between the time 200 and a time 300. As also illustrated, the haptic renderer 302 may attempt to begin rendering at a time 125 and has a buffer size of 50 sample frames. Thus, the haptic renderer could begin rendering the first buffer of 50 sample frames between the time 125 and a time 175, a second buffer of 50 sample frames between the time 175 and a time 225, and a third buffer of 50 sample frames between the time 225 and a time 275.

However, as illustrated, the haptic renderer 302 is not ready to render its first buffer of 50 sample frames at the time 100 when the speaker renderer 301 is ready to render its first buffer of 100 sample frames. The synchronization time 303 may therefore be set equal to the time 200, corresponding to the next input/output cycle of the speaker renderer, as that is the next time the speaker renderer will check in and determine that the haptic renderer is be ready to render its first buffer of 50 sample frames. As such, the speaker renderer may begin rendering its first buffer of 100 sample frames at the synchronization time 303 (the time 200) and the haptic renderer also may begin rendering its first buffer of 50 sample frames at the synchronization time 303.

Although FIG. 3 sets the synchronization time 303 as the next input/output cycle of the speaker renderer 301 after both renderers 301 and 302 are ready to render their respective first buffer of sample frames because the input/output cycle of the speaker renderer is longer, it is understood that this is an example and other configurations are possible. For example, both renderers are capable of rendering their respective first buffer of sample frames as of the time 175, and in some implementations such a time when all independent renderers are capable of rendering their respective first buffer frame may be selected as the synchronization time (i.e., the time 175 in this example).

Certain embodiments may add an inter-channel time delay to one or both of the output streams prior to rendering as perceptible output. As one example, the delay may be added to the beginning of one of the buffers or one of the frames, and typically to the beginning of the buffer or frame. Continuing the non-limiting example, the second output stream may be delayed until approximately 85% of the first output stream has been played back (or a corresponding output has been played back). The delay may be added in order to account for a time delay between a user perceiving a first modality of output and a second modality of output, in certain embodiments. The delay may thus have the result that the first and second modalities of output are perceived by the user at the same time even though one is slightly delayed. It should be appreciated that the first and second output types are still synchronized and the frames/buffers may be substantially simultaneously rendered, as described herein; the initial portion of one buffer/frame may equate to zero output through operation of the added time delay.

As one non-limiting example, consider an electronic device employing certain embodiments described herein to provide an audio output and a haptic output, with data for both types of output being encoded and transmitted by a processing unit to the respective output devices on first and second channels of an internal stereo audio connection. If the electronic device is typically worn or held by a user and the two outputs are provided simultaneously (e.g., synchronized with one another and without any time delay), then the user may hear the audio output before he feels the haptic output because auditory impulses travel faster to the user's brain than do haptic impulses. Thus, even though the two outputs are synchronized and rendered simultaneously, the perceptual delay by the user may make them appear to be asynchronous. Continuing the example, the audio output may be delayed with respect to the haptic output, such that the two occur perceptually simultaneously or near-simultaneously.

In certain embodiments, salience of the alert and/or power consumption by the alert may be two factors that impact the timing of any delay between the outputs. Salience will first be discussed.

Salience is the ability of the alert (or its component outputs) to be perceived relative to other phenomena. Generally, having the component outputs of the alert perceptually appear to be synchronized increases the salience of the alert, which may aid in drawing a user's attention. It should be appreciated that perceptual synchronization may be more important than actual time synchronization of the component outputs, insofar as the user's perception is the measure of salience; perceptual synchronization may make the alert more noticeable.

Figure 4A:
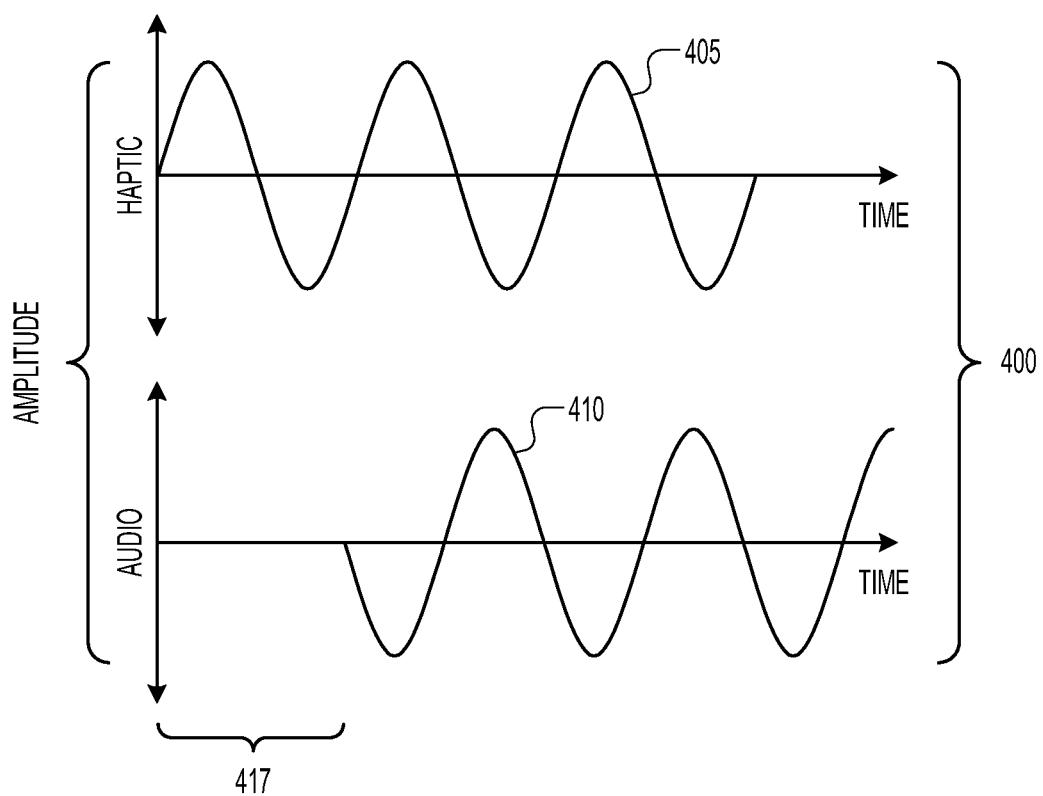
FIG. 4A is a graph illustrating example synchronization of two outputs for a single alert.

Generally, and for the reasons set forth above, enhancing or maximizing salience of an alert may mean temporally delaying initiating one of the outputs with respect to the other, as shown in FIG. 4A. For example, consider an alert 400 with a haptic output 405 and an audio output 410. The audio output may be slightly delayed with respect to the haptic output in order for the user to perceive that they are in sync, due to the lower travel speed of nerve impulses when compared to the speed of sound through air (as discussed above). Although the exact delay may vary between embodiments, between alerts, between different components used in alerts, and between devices, in certain embodiments the delay 417 may be approximately 10-35 milliseconds between initiation of the audio output and the haptic output, and in certain embodiments the delay may be 15-25 milliseconds. The processing unit and/or synchronization component may provide instructions to the renderers regarding synchronization of the outputs and any delay in one or both of the outputs, or one or both of the renderers may determine such synchronization.

In certain embodiments, it may be useful to select a haptic output and/or audio output that repeat relatively quickly, e.g., have a relatively short period. Periods of 10-30 milliseconds for outputs may permit the two to be perceptually synchronized while playing them sequentially, as one example. That is, in one example, the haptic output may be played first followed by the audio output once the haptic output has completed playback or has completed at least 85% of playback. Further, it may be useful and increase salience to select outputs 405, 410 that have the same or similar periods, so that peaks, troughs, and other user-experienced cues in the outputs perceptually align. As one non-limiting example, the period of the output(s) 405, 410 may be less than the perceptual delay 415 between the outputs, although this is not required.

Figure 4B:
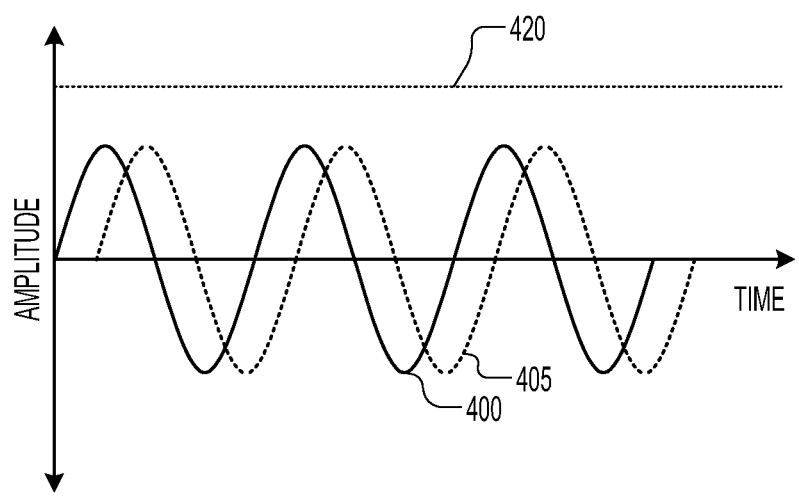
FIG. 4B is a graph illustrating example synchronization of two outputs for a single alert with respect to an overall power consumption.

Further, by choosing outputs with relatively short periods that thus may be played sequentially, peak power consumed by an electronic device outputting the alert may be minimized and/or kept below a threshold. As indicated, certain alerts may be structured to place the peak of each component output waveform at a time other than when the peak of any other component output waveform occurs. Thus, power may be budgeted between the individual outputs of the alert without necessarily having either output exceed a maximum power that may be provided by the device, as shown in FIG. 4B. Here, a haptic output 400 and an audio output 405 are shown along with a power consumption 420 for the combined output. Since the haptic and audio outputs 400, 405 do not have peak amplitudes at the same time, they do not require maximum power simultaneously or otherwise exceed a power threshold. Thus, the delay between the outputs 400, 405 may keep the overall alert power consumption within a budgeted amount. In some embodiments, the power threshold is between 0.5 and 1.0 watts, inclusive.

In many embodiments, the offset of one output with respect to the other is such that the second output begins playing as the first output ends (and, in some embodiments, vice versa). The periods of the two outputs need not be the same but are generally chosen so that any difference in periods is insufficient to cause large changes in synchronization of the playback of successive frames of each output across the life of the alert. That is, although different periods for each of the outputs may cause the start times of the outputs to change with respect to one another on each successive playback of the outputs, the overall change or drift may remain within the desired offset.

An example may aid in comprehending the above. Consider an alert having a haptic output with a period of 13 milliseconds and an audio alert with a period of 14 milliseconds, and a delay of 15 milliseconds between initiating the two alerts in order to increase salience. In such an embodiment, the audio begins playing 2 milliseconds after the first frame of the haptic output ends. The second frame of audio begins playing 3 milliseconds after the second frame of the haptic output ends. The third frame of audio begins playing 4 milliseconds after the third frame of the haptic output ends, and so on. If a user cannot perceive any difference in salience until the waveforms are at least 25 milliseconds apart, then 25 frames of haptic and audio output may be played before any pause or resynchronization may be initiated. Likewise, if the audio and haptic outputs continue to play for an extended period of time and gradually desynchronize, the combined outputs (e.g., the alert) may exceed the power envelope at some point, thus requiring either resynchronization or the reduction of power to one or both of the component outputs.

To maintain perceptual synchronization and/or power budgeting, it may be useful for the period of a first output to be within 10% of the period of a second output (e.g., 90%-110%). Further, it may be useful for the periods of the first and second outputs to be selected such that they are 180 degrees out of phase, thereby lowering the overall power constraints of the system and reducing the likelihood of exceeding the power threshold.

It should be appreciated that the period of individual outputs of an alert may vary with a number of system characteristics. As one example, it may be desirable for a haptic output to be at or near a resonant frequency of an enclosure on which the haptic output resonates. Taking the above example, a haptic output having approximately a 13 millisecond period has approximately a 76-77 Hz frequency, and so would cause an enclosure having the same resonant frequency to amplify the haptic output.

Figure 4C:
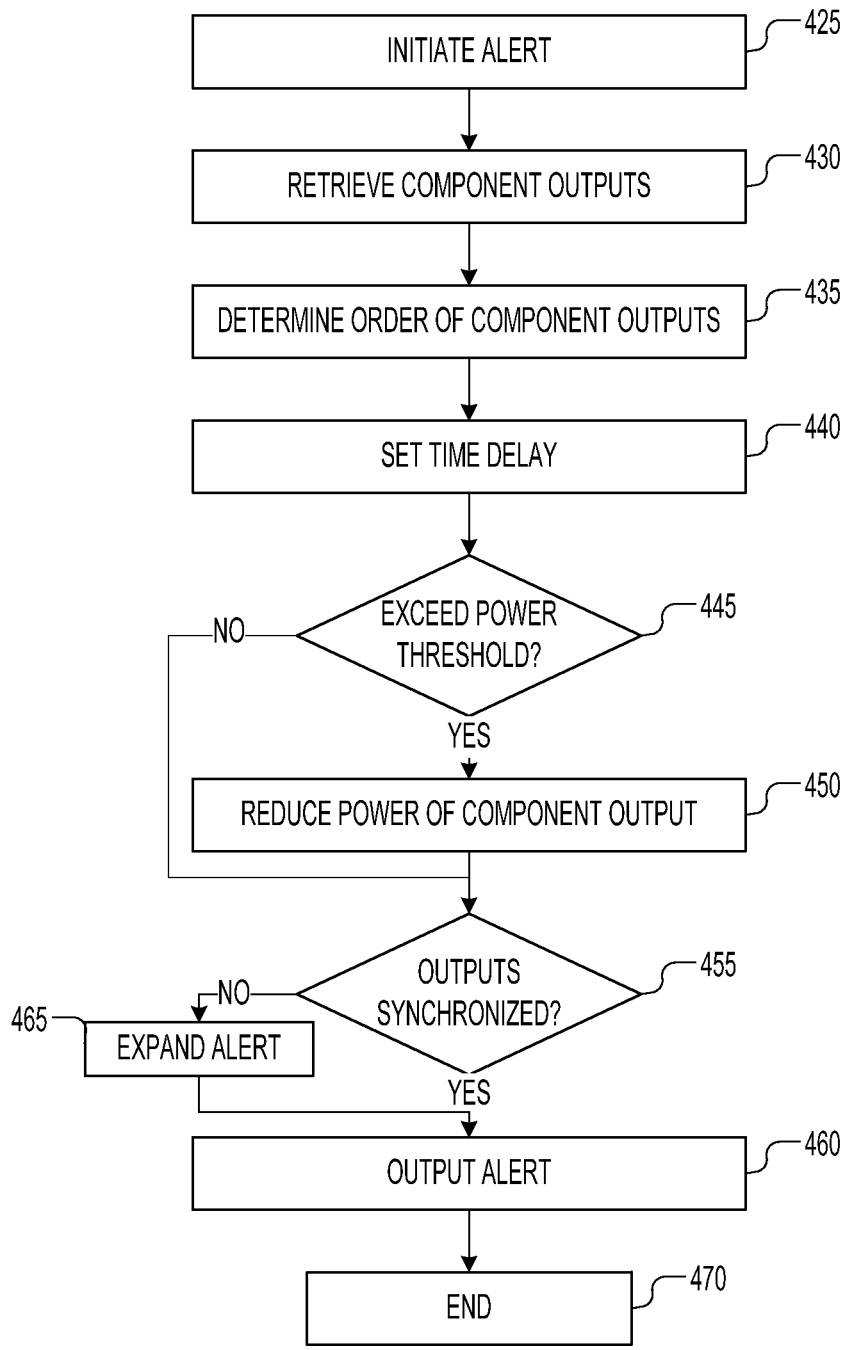
FIG. 4C is a flowchart illustrating a sample method for determining an offset between multiple outputs of a single alert.

FIG. 4C is a flowchart depicting one sample method for determining periods of one or more component outputs of an alert. It should be appreciated that the sample method need not be applied to all component outputs, or conversely may be applied to more than one component output. Generally, although not necessarily, the method of FIG. 4C may be applied to all but one of the component outputs.

The method begins in operation 425, in which the device 101 initiates output of an alert. Next, in operation 430, the device retrieves the component outputs of the alert, for example from the aforementioned memory; the component outputs may be stored as waveforms in the memory. Certain component outputs may be generated from stored parameters rather than retrieved. As one non-limiting example, a device 101 may retrieve a quality factor (e.g., Q factor) and resonant frequency of a housing of an electronic device or the overall electronic device. A haptic output may be generated at least partially based on the Q factor of the haptic actuator or device 101, resonant frequency of the haptic actuator or device 101, a shape of the haptic waveform, a desired length of playback time, an intensity level during playback, or a combination thereof. The desired length of time may represent a duration during which the alert (or any individual component output) is played. The intensity level may be a percentage or fraction of a default intensity level. The default intensity level may be based on a maximum amplitude, a default amplitude, or a default power (e.g., one watt, half a watt, and so on). With lower intensity, less power is used to generate the haptic output; so, in one embodiment, the intensity level may represent or correspond to a power usage by the device 101. In operation 435, the device 101 determines the order in which the component outputs will be outputted.

In operation 440, the device 101 sets a time delay between the component outputs, as described elsewhere herein. Generally, one component output (e.g., the haptic output) may be played back beginning at a set time and the time to start playback of the other component output (e.g., the audio output) (or more, if there are more component outputs) may be temporally adjusted accordingly. It should be appreciated that temporal adjustment may constitute a delay in playback of the second component output (e.g., the audio output) or accelerating playback of the first component output (e.g., the haptic output).

Figure 4D:
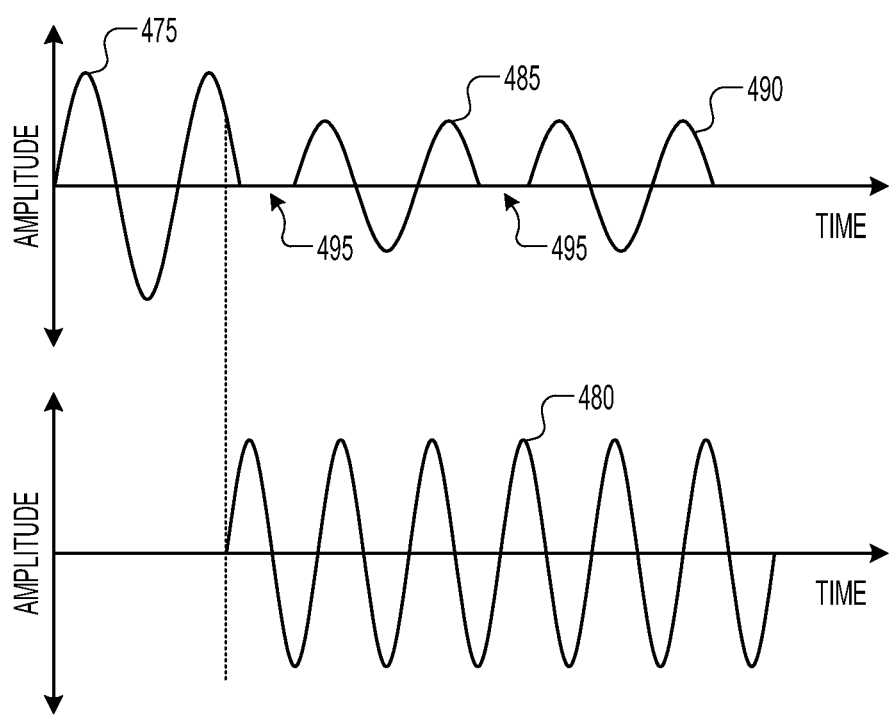
FIG. 4D is a graph illustrating intensity adjustment of a component output to account for power consumption of another component output.

In operation 445, the device 101 determines if the playback of all component outputs, as scheduled, exceeds a maximum power threshold. This power threshold may be a value that the system or component outputs should not exceed at any given point, or it may be a value that should not be exceeded in the aggregate across a certain duration. Exceeding the threshold may occur, for example, when one or more of the component outputs have an amplitude or intensity that increases over time. One specific example of this is an audio output that gets steadily louder; another is a haptic output that grows in force over time. Another example is an audio output that is played simultaneously with one or more haptic outputs over a duration of time, one example of which is illustrated in FIG. 4D and discussed below.

Still with respect to FIG. 4C, if the device 101 determines in operation 445 that a maximum power will be exceeded, the device 101 executes operation 450 and reduces the power consumption or intensity level of one or more component outputs. This may be done by reducing the amplitude of the one or more component outputs, for example.

If the device 101 determines in operation 445 that a maximum power will not be exceeded, the device then proceeds to operation 455.

In operation 455, the device 101 may determine if the component outputs are sufficiently synchronized, as discussed elsewhere herein. If so, the device 101 proceeds to operation 460 and outputs the alert. Outputting the alert may include playing the component outputs multiple times, adjusting power and/or synchronization of the component outputs as described herein, and so on. Generally, and as discussed below with respect to operation 465, the component outputs of the alert are outputted in accordance with the order determined in operation 435 and the time delay determined in operation 440, the amplitudes or intensity levels determined in operation 450, and the synchronization determined in operation 455.

If the device 101 determines in operation 455 that the outputs are not sufficiently synchronized, the device 101 proceeds to operation 465 and expands, lengthens, shortens, or otherwise alters the playback time of one or more component outputs. This may be done not only to synchronize outputs but also to ensure that certain component outputs are played at or close to a resonant frequency of a device or enclosure. Thus, as one example, a haptic output's frequency may be increased or decreased to match or more closely approximate the aforementioned resonant frequency. Audio outputs may be likewise matched or adjusted for a device/enclosure resonant frequency. The device 101 then proceeds to operation 460 and outputs the alert.

After operation 460, the device 101 proceeds to ends state 470. Generally, the alert may end either once a user acknowledges the alert, when a certain time is reached (e.g., the end of the alert is reached) or once a condition is met (such as the end of an incoming phone call as one non-limiting example).

FIG. 4D illustrates a sample alert having two component outputs, namely a haptic output and an audio output 480. The haptic output may be made from multiple waveforms (or components thereof) 475, 485, 490; in some cases each of the haptic waveforms may be separated by an inter-waveform temporal interval 495 although this is not necessary in all embodiments.

As shown in FIG. 4D, the first haptic waveform 475 may have a first amplitude or intensity at which it is played back. In one embodiment, the first haptic waveform 475 may be played back at default amplitude or intensity. Once playback of the first haptic waveform 475 is substantially complete (for example, 85% complete), the audio output 480 may begin playback at its full intensity or amplitude.

The device 101 may determine that the combination of the haptic and audio outputs may exceed a power threshold if the remaining haptic waveforms 485, 490 are played back at the default amplitude or intensity. Accordingly, the device may reduce the intensity of subsequent haptic waveforms 485, 490 when played back in order to maintain the total power consumed by the alert (including both the haptic and audio outputs) below the threshold. Thus, the reduced intensity of the haptic waveforms 485, 490 may account for, or otherwise offset, the power consumed by the audio waveform 480.

Although the haptic waveforms 485, 490 are shown as having the same reduced intensity, it should be appreciated that the device 101 may modify the intensity of one haptic waveform with respect to the other to account for fluctuations in the audio output 480. For example, if the audio output 480 increases in intensity after the second haptic waveform 485 is played, the intensity of the third haptic waveform 490 may be further diminished. As one option, the device 101 may determine a peak intensity, amplitude, or other measurement of power draw of the audio output 480 and scale the intensity/amplitude/power of all haptic waveforms that are played back during output of the audio waveform accordingly. Alternatively, such scaling may occur dynamically as playback of the component outputs proceeds, thereby permitting the device to modify intensity/amplitude of a component output on the fly and, in some embodiments, only for part of a waveform.

In another embodiment, rather than or in addition to scaling the intensity of the haptic output, the device 101 may reduce the intensity of the audio output during playback to maintain the alert output below a certain power threshold. This may occur, for example, if there is a minimum threshold below which the intensity of the haptic output may not be scaled. In that case, the device 101 may reduce the intensity of the audio output during playback instead of or in addition to reducing the intensity of the haptic output. As discussed above, the intensity or amplitude of the audio and/or haptic outputs may be scaled dynamically as playback proceeds, and, in some embodiments, for part of a waveform.

The time delay (if any) implemented in an embodiment and synchronization of output streams, may be chosen based on a number of factors, such as the types of output being provided, the type of output being delayed, the assumed or actual location or distance of the device with respect to a user or a user's sensory organs, whether a user is touching the device, and so on. In some cases the time delay may be a default value that is inserted into a buffer or frame while in other cases the time delay may be dynamically calculated based, for example, on sensor data gathered by the electronic device.

FIGS. 5A-5D are diagrams illustrating an example synchronization object 500A-500D for two output streams during synchronization corresponding to the operation 300 illustrated in FIG. 3. As illustrated in this example, the synchronization object may be an array with rows for each of the speaker renderer 301 and haptic renderer 302 of FIG. 3. As also illustrated in this example, the synchronization object may have rows for the status time for each of the independent renderers, the frames requested for rendering for each of the independent renderers, and the status of each of the independent renderers.

Though the synchronization object 500A-500D is illustrated as an array with particular data elements in FIGS. 5A-5D, it is understood that this is an example. In various implementations, any kind of data structure(s) with any kind of data elements may be utilized without departing from the scope of the present disclosure.

FIG. 5A may represent the state of the synchronization object 500A at the time 100 illustrated in FIG. 3. As shown, at the time 100 the speaker renderer may interact with the synchronization object to update its status time, frames requested for rendering, and/or status. As such, the synchronization object at this time may have a value of 100 for the speaker renderer's status time, a value of 100 for the speaker renderer's frames requested for rendering, and a value of "ready" for the speaker renderer's status. However, the synchronization object at this time may have a value of NA for the haptic renderer's status time, a value of NA for the haptic renderer's frames requested for rendering, and a value of "waiting" for the haptic renderer's status as the haptic renderer has not attempted to begin rendering and/or accessed the synchronization object at the time 100.

FIG. 5B may represent the state of the synchronization object 500B at the time 125 illustrated in FIG. 3. As shown, at the time 125 the haptic renderer may interact with the synchronization object to update its status time, frames requested for rendering, and/or status. As such, the synchronization object at this time may have a value of 125 for the haptic renderer's status time, a value of 50 for the haptic renderer's frames requested for rendering, and a value of "ready" for the haptic renderer's status. However, the synchronization object at this time still may have a value of 100 for the speaker renderer's status time, a value of 100 for the speaker renderer's frames requested for rendering, and a value of "ready" for the speaker renderer's status as the speaker renderer has not reached its next input/output cycle yet.

As the synchronization object 500B indicates that both of the independent renderers are ready to render at the time 125, the synchronization time may then be determined from the synchronization object. The synchronization object indicates that the speaker renderer has a status time of 100 and a number of frames requested for rendering of 100. As such, the synchronization object indicates that the next input/output cycle for the speaker renderer will be at the time 200 (or status time added to the frames requested for rendering). Similarly, the synchronization object indicates that the haptic renderer has a status time of 125 and a number of frames requested for rendering of 50. As such, the synchronization object indicates that the next input/output cycle for the haptic renderer will be at the time 175. However, as the speaker renderer will not check in until the speaker renderer's next cycle time (time 200) to learn that all renderers are ready, the time of the speaker renderer's next cycle time is selected as the synchronization time.

FIG. 5C may represent the state of the synchronization object 500C at the time 175 illustrated in FIG. 3. As shown, at the time 175 the haptic renderer may interact with the synchronization object to update its status time, frames requested for rendering, and/or status. As such, the synchronization object at this time may have a value of 175 for the haptic renderer's status time, a value of 50 for the haptic renderer's frames requested for rendering, and a value of "ready" for the haptic renderer's status. However, the synchronization object at this time still may have a value of 100 for the speaker renderer's status time, a value of 100 for the speaker renderer's frames requested for rendering, and a value of "ready" for the speaker renderer's status as the speaker renderer has not reached its next input/output cycle yet.

FIG. 5D may represent the state of the synchronization object 500D at the time 200 illustrated in FIG. 3. As shown, at the time 200 the speaker renderer may interact with the synchronization object to update its status time, frames requested for rendering, and/or status. As such, the synchronization object at this time may have a value of 200 for the speaker renderer's status time, a value of 100 for the speaker renderer's frames requested for rendering, and a value of "synced" or "synchronized" for the speaker renderer's status. As the synchronization time (the time 200) has been reached, the speaker renderer and the haptic renderer may begin rendering their respective output streams.

Although the synchronization time in the above example was determined as the next input/output cycle time of the renderer with the longest input output cycle time, this may not be the case in all examples. The synchronization time may in fact be determined as the maximum of the next input/output cycle time that will occur for any renderer after all renderers check in. For purposes of such an analysis, the "next" input/output cycle time of a renderer, as it checks in, is actually that renderer's current input/output cycle time insofar as a renderer can check in, cause synchronization to be established and then begin rendering immediately or substantially immediately. As one example, if the haptic renderer had checked in at a time 75 before the speaker renderer checked in at time 100, all renderers would have been ready to render at time 100 and the synchronization time may have been set as the next input/output cycle time for any renderer, which would have been time 125 for the haptic renderer.

Figure 6:
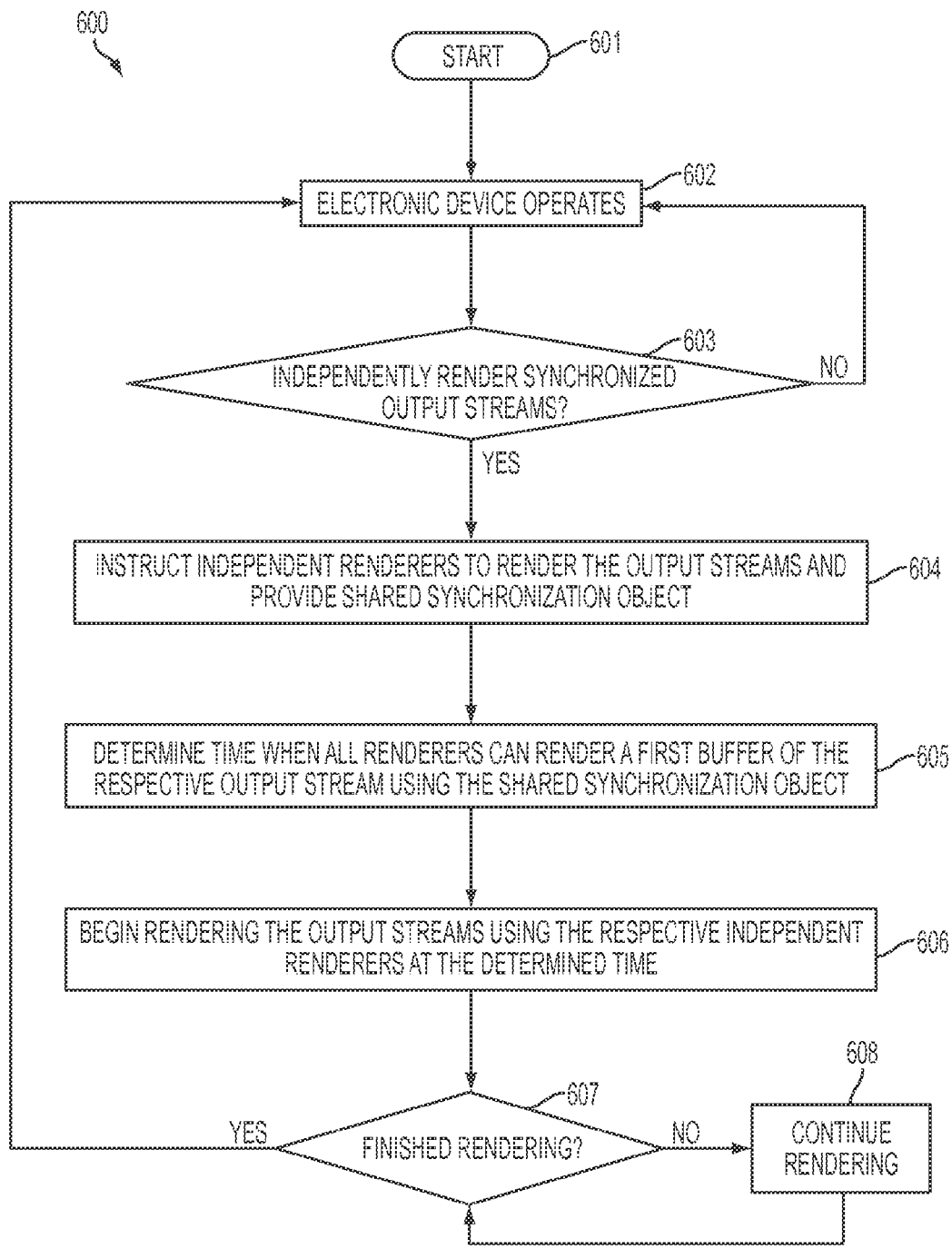
FIG. 6 is a flowchart illustrating an example method for synchronizing independent output streams. This method may be performed by the system of FIG. 1.

FIG. 6 is a flowchart illustrating an example method 600 for synchronizing independent output streams. This method may be performed by the system of FIG. 1 and such independent output streams may be transmitted across the two channels of a stereo audio channel, as one non-limiting example. In such an embodiment, the output streams may each be transmitted as or on an audio channel.

The flow begins at block 601 and proceeds to block 602 where an electronic device operates. The flow then proceeds to block 603 where it is determined whether or not to independently render output streams that are to be synchronized. If so, the flow proceeds to block 604. Otherwise, the flow returns to block 602 where the electronic device continues to operate.

At block 604, after it is determined to independently render output streams that are to be synchronized, independent renderers are instructed to render each of the output streams and are each provided a shared synchronization object. The flow then proceeds to block 605 where a time is determined from the shared synchronization object when all independent renderers can render a first buffer of their respective output stream. Next, the flow proceeds to block

606 where rendering of each of the output streams is begun using the respective independent renderers at the determined time.

The flow then proceeds to block 607 where it is determined whether or not rendering of the output streams is completed. If so, the flow returns to block 602 and the electronic device continues to operate. Otherwise, the flow proceeds to block 608.

At block 608, rendering of one or more of the output streams continues. The flow then returns to block 607 where it is determined whether or not rendering of the output streams is completed.

Although the example method 600 is illustrated and described as performing particular operations in a particular order, it is understood that this is an example. In various implementations, various orders of the same, similar, and/or different operations may be performed without departing from the scope of the present disclosure.

For example, the example method 600 is illustrated and described as determining whether or not rendering is finished at block 607. However, in various implementations such a determination may not be performed. Instead, the flow may return directly from block 406 to block 602 when rendering of all output streams completes and/or is otherwise cancelled.

As described above and illustrated in the accompanying figures, the present disclosure discloses systems, computer program products, and methods for synchronizing independent output streams. At least two output streams that are to be synchronized may be determined to be rendered using at least two independent renderers. The independent renderers may be provided with a shared synchronization object when instructed to render the respective output stream. A time when all of the independent renderers can render a respective first buffer of the respective output stream may be determined from the shared synchronization object. Rendering of the output streams utilizing the independent renderers may be begun at the determined time. In this way, rendering of the output streams may be synchronized. Such synchronization may ensure that a user experiences the rendered output streams as intended. Such synchronization may also enable component(s) to stay within a power utilization constraint that would be exceeded if the output streams were rendered without synchronization.

Although the present disclosure is illustrated and described above as synchronizing output streams, it is understood that this is an example. In various implementations, streams other than audio may be synchronized without departing from the scope of the present disclosure.

Further, although a specific architecture is discussed (such as two channels of a stereo stream between a processing unit and a codec), it is understood that this is an example. In various implementations the synchronization techniques discussed herein may be utilized to synchronize output streams rendered utilizing two or more separate hardware outputs.

Additionally, though the present disclosure is illustrated and described as synchronizing streams that are rendered in a single linear sequence, it is understood that this is an example and that other arrangements are possible and contemplated. For example, a ringtone may include a sound and a vibration that are repeated periodically but may not have identical durations. In such an example case, rendering the ringtone may include loops of rendering the sound and vibration and the synchronization techniques discussed herein may be utilized to synchronize the start point of each loop. In various cases, a delay caused in rendering the first loop may or may not be repeated in subsequent loops.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

One or more Application Programming Interfaces (APIs) may be used in some embodiments and functionality discussed herein may be implemented as, or access by, an API. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A system for providing an alert, comprising:
a memory operative to store a first and second plurality of output waveforms;
at least one processing unit operatively coupled to the memory;
a first output device operatively coupled to the at least one processing unit; and
a second output device operatively coupled to the at least one processing unit; wherein
the first output device is operative to output a first waveform from the first plurality of output waveforms, the first output device configured to provide a first alert modality;
the second output device is operative to output a second waveform from the second plurality of output waveforms, the second output device configured to provide a second alert modality;
the first and second alert modalities are different;
output of the second waveform is delayed until at least a portion of the first waveform is outputted; and
output of the second waveform is delayed relative to output of the first waveform by a duration sufficient to maintain power consumption for outputting the first and second waveforms below a threshold.

2. The system of claim 1, wherein the threshold is between 0.5 and 1.0 watts, inclusive.

3. The system of claim 1, wherein:
the first plurality of output waveforms correspond to a haptic output; and
the second plurality of output waveforms correspond to an audio output.

4. The system of claim 3, wherein the second waveform is played after the first waveform finishes.

5. The system of claim 3, wherein the second waveform is delayed by between 10 and 35 milliseconds, inclusive.

6. The system of claim 3, wherein either of the first and second waveforms is no more than 10% longer or shorter, temporally, than the other waveform.

7. The system of claim 3, wherein the first and second waveforms are 180 degrees out of phase with one another.

8. The system of claim 3, further comprising:
an enclosure surrounding at least the first and second output devices; wherein a period of the haptic output has a frequency matching a resonant frequency of the first output device.

9. A method for providing an alert comprising multiple component outputs, comprising:
beginning outputting a first component output from a first output structure;
waiting a specified time;
beginning outputting a second component output from a second output structure after the specified time; wherein
the second component output is of a different modality than that of the first component output; and
an intensity of the first component output is reduced after beginning output of the second component output; and
varying the specified time to maintain a power consumed by the first and second output structures below a threshold.

10. The method of claim 9, wherein the specified time corresponds to at least 85% of the output time of the first component output.

11. The method of claim 9, further comprising the operation of resynchronizing the first and second component output structures.

12. The method of claim 9, wherein the specified time is no more than 25 milliseconds.

13. The method of claim 9, wherein:
at least a portion of the first and second component outputs are outputted simultaneously;
the first component output increases in amplitude with time; and
at least one of the first and second component outputs' amplitudes are reduced to maintain a power consumption of a system below a threshold.

14. The method of claim 9, further comprising:
retrieving a quality factor and a resonant frequency of a housing from a storage medium; and
generating a first component output at least partially from the quality factor and the resonant frequency.

15. A method for providing an alert, comprising:
determining to output an alert in response to entering an alert condition;
retrieving component outputs of the alert from a storage medium;
determining an order of the component outputs based on settings stored in the storage medium;
setting a time delay between outputting each of the component outputs; and
outputting the alert in accordance with the order and the time delay using at least one output device; wherein
at least 85% of a first one of the component outputs is output prior to outputting a second of the component outputs.

16. The method of claim 15, further comprising:
determining whether a power threshold is exceeded by a cumulation of all of the component outputs;
in the event the power threshold is exceeded, reducing an amplitude of at least one of the component outputs; and
in the event the power threshold is not exceeded, maintaining the amplitudes of the component outputs.

17. The method of claim 15, further comprising:
determining if the component outputs are properly synchronized with each other;
in the event the component outputs are not properly synchronized with each other, altering a temporal interval of at least one of the component outputs; and
in the event the component outputs are properly synchronized with each other, maintaining the temporal interval of the component outputs.

18. The method of claim 15, wherein at least one of the component outputs is generated based on a quality factor and a resonant frequency of a structure associated with outputting the alert.

19. A system for providing an alert, comprising:
a memory operative to store a first and second plurality of output waveforms;
at least one processing unit operatively coupled to the memory;
a first output device operatively coupled to the at least one processing unit;
a second output device operatively coupled to the at least one processing unit; wherein the first output device is operative to output a first waveform from the first plurality of output waveforms, the first output device configured to provide a first alert modality;

the second output device is operative to output a second waveform from the second plurality of output waveforms, the second output device configured to provide a second alert modality, wherein:

the first and second alert modalities are different; and output of the second waveform is delayed relative to output of the first waveform by a duration sufficient to maintain power consumption for outputting the first and second waveforms to no more than one watt at any time during output.

20. The system of claim 19, wherein the portion of the first waveform is approximately 85%.

21. A method for providing an alert comprising multiple component outputs, comprising:

beginning outputting a first component output from a first output structure;

waiting a specified time;

beginning outputting a second component output from a second output structure after the specified time; wherein the second component output is of a different modality than that of the first component output;

an intensity of the first component output is reduced after beginning output of the second component output;

at least a portion of the first and second component outputs are outputted simultaneously;

the first component output increases in amplitude with time; and at least one of the first and second component outputs' amplitudes are reduced to maintain a power consumption of a system below a threshold.

* * * * *